United States Patent Office 2,775,604
Patented Dec. 25, 1956

2,775,604

QUATERNARY AMMONIUM HALIDES

John David Zech, Wilmington, Del., assignor to Atlas Powder Company, Wilmington, Del., a corporation of Delaware No Drawing. Application February 9, 1953,
Serial No. 336,005

14 Claims. (Cl. 260—404.5)

The present invention relates to new organic ammonium compounds and relates more particularly to quaternary ammonium halides which are suitable for various uses as wetting agents, detergents, emulsifying agents, germicides, fungicides, anti-static agents, textile assistants, textile lubricants, corrosion inhibitors, lubricant additives, mold release agents, chemical intermediates, and the like.

It is an object of the present invention to prepare surface active quaternary ammonium halides having three or more free hydroxyl groups. It is a further object to prepare cationic surface active agents, by the quaternization of tertiary amines, having at least one long chain alkyl group with the condensates of epihalohydrins with polyhydric alcohols having at least three hydroxyl groups or polyoxyalkylene ethers of said polyhydric alcohols. Further objects and advantages will become obvious to those skilled in the art from the following disclosure.

The compounds of this invention are defined by the formula:

$$\left[ R - \begin{matrix} O(C_nH_{2n}O)_vCH_2CHOHCH_2-N-R_2 \\ | \\ [O(C_nH_{2n}O)_yH]_z \end{matrix} \begin{matrix} X & R_1 \\ | \\ R_3 \end{matrix} \right]_w$$

wherein:

R=hydroxyl free residue of a polyol having 3 to 6 OH groups and from 3 to 10 carbon atoms
$n=2$ to 3
$v=0$ to 10
$y=0$ to 10
$w=1$ to 6 but not greater than the number of OH groups in the polyol
$z$=number of original OH groups in polyol less $w$
$vw+yz$=not greater than 10
$R_1$=a lipophilic radical with 6 to 25 carbon atoms
$R_2$ and $R_3$ are selected from the group consisting of lower alkyl radicals and lower aliphatic radicals which together with N form a heterocyclic ring
X=halogen A typical compound of this class may be represented by the formula (spatial configuration being ignored):

$$\left[ \begin{matrix} CH_3 \\ | \\ CH_2O-CH_2CH(OH)CH_2-N-C_{12}H_{25} \\ | \\ (CHOH)_4 & CH_3 \\ | \\ CH_2OH \end{matrix} \right] Cl$$

This compound may be considered as the lauryl dimethyl amine quaternized with the compound $$\begin{matrix} CH_2OCH_2CH(OH)CH_2Cl \\ | \\ (CHOH)_4 \\ | \\ CH_2OH \end{matrix}$$

which is the addition product of a hexitol and epichlorohydrin. With reference to the generic formula above R is the residue of a hexahydric alcohol
$v$ is 0
$y$ is 0
$z$ is 5
$w$ is 1
$vw+yz$ is 0
$R_1$ is $C_{12}H_{25}$
$R_2$ and $R_3$ are $CH_3$
X is Cl The definition of $R_1$ as a lipophilic radical with 6 to 25 carbon atoms is meant to include a hydrocarbon radical or an alkyl substituted aralkyl radical where the alkyl substituent is a hydrocarbon group containing from 6 to 18 carbon atoms such as

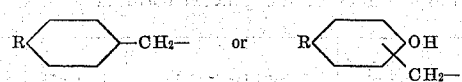

wherein R is a hydrocarbon group of 6 to 18 carbon atoms.

Within the definition of $R_1$ are also to be included such radicals as

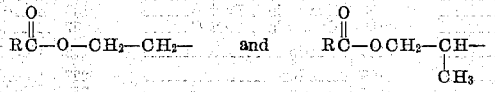

wherein R is a hydrocarbon radical of 6 or more carbon atoms. Tertiary amines containing such a group, for the purposes of this invention, would be carboxylic acid esters of dialkyl amino-alkanols.

In the preferred method for making the compounds of the invention an epihalohydrin such as epichlorohydrin is first condensed with a polyhydric alcohol having at least three hydroxyl groups. Among the polyhydric alcohols that are suitable for this purpose are such alcohols as sorbitol, mannitol, erythritol, glycerol, diglycerol, triglycerol, pentaerythritol, dipentaerythritol, etc. Not only may the polyhydric alcohols themselves be condensed with the epihalohydrins, but the polyoxyalkylene ethers of said polyhydric alcohols may also be condensed with the epihalohydrins, such as hydroxy polyoxyethylene sorbitol, hydroxy polyoxyethylene glycerol, hydroxy polyoxypropylene glycerol, hydroxy polyoxyethylene pentaerythritol, hydroxy polyoxyethylene, diglycerol, etc. The number of oxyalkylene groups per mole of polyol may vary widely, but those compounds are preferred wherein the number of polyoxyalkylene groups ranges from 1 to 10 moles per mole of polyol. The condensation of the epihalohydrin and the polyhydric alcohol or a polyoxyalkylene ether of said alcohol, takes place in the presence of an acidic type of catalyst, such as $AlCl_3$, $BF_3$, $SnCl_4$, etc., yielding the corresponding glyceryl monochlorohydrin ether of said polyhydric alcohol or of a polyoxyalkylene ether of said polyhydric alcohol. Either a glyceryl monochlorohydrin monoether may be formed or a glyceryl monochlorohydrin polyether may be formed depending primarily on the molar proportions of the starting materials. The proportion of the above reactants may vary widely but the preferred range is from about 1 to 2 moles of epihalohydrin per mole of polyhydric alcohol or polyoxyalkylene ether of said polyhydric alcohol. The above condensation reaction is exothermic and is controlled by the gradual addition of the epihalohydrin to the polyol which also contains the selected acidic type catalyst. These condensates thus formed are then reacted with a suitable tertiary amine having at least one long chain alkyl group or an alkyl aryl group wherein said alkyl radical is a long chain aliphatic radical at a temperature of about 90° C. to 135° C.

The preferred tertiary amines are those having a minimum steric hinderance at the tertiary N atom. Suitable tertiary amines include (but are not limited to) lauryl dimethylamine, cetyl dimethylamine, octadecyl dimethylamine, dimethylaminoethyl stearate, dimethylaminoethyl oleate, dimethylaminoethyl laurate, 2 hydroxy-5-nonyl benzyl dimethylamine, dodecylbenzyl dimethylamine, 3-dimethylamino-2-propyl stearate, oleate, laurate, benzoate, p-tert butyl benzoate, tallate (ester of tall oil), rosinate (ester of rosin), etc. Other carboxyic acid esters of dialkyl amino-alkanols of this class are also satisfactory tertiary amines. The esters may be prepared from any suitable carboxylic acid, such as benzoic, p-tert butyl benzoic, capryllic pelargonic capric, lauric, palmitic, stearic, oleic, behenic, erucic, linoleic, tall oil, rosin, etc. Alkyl morpholines such as cetyl morpholine, 2-morpholinoethyl stearate, etc., may be used, but are somewhat less reactive due to steric hindrance.

Tertiary amines of the general formula

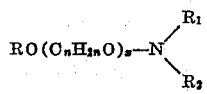

wherein

R = a higher alkyl radical containing from 10 to 20 carbon atoms
$R_1$ and $R_2$ are lower alkyl groups
$x = 1$ to 6 have been found satisfactory for the purposes of this invention.

These new quaternary ammonium compositions derived from the sorbitol-epichlorohydrin condensates are soft to hard waxy substances which are water soluble, forming viscous foaming solutions. The multiplicity of free hydroxyl groups is believed to favor their strong adsorption on surfaces.

The following examples are given as best illustrating the invention and are not to be taken as limiting the invention in any way.

Example 1

The following epichlorohydrin-sorbital condensates were prepared in the manner depicted.

A. 530 g. of epichlorohydrin was added dropwise with stirring to 522 g. molten anhydrous sorbitol containing 1 cc. of $BF_3$ etherate (48% $BF_3$) during 1 hour at 105°–118° C. The reaction was exothermic. Stirring was continued 20 minutes during which time the temperature dropped to 85° C. The product was a very viscous, nearly colorless syrup at room temperature. It was a chlorohydrin ether of sorbitol containing an average of two chlorohydrin groups per mole.

B. 370 g. of epichlorohydrin was reacted with 733 g. of anhydrous sorbitol in the presence of 1.4 cc. of $BF_3$ etherate in the same manner as outlined in part A of this example. The product was similar in its physical characteristics to that obtained in part A. It was a chlorohydrin ether of sorbitol containing one chlorohydrin group per mole.

C. 555 g. of epichlorohydrin was reacted with 733 g. of anhydrous sorbitol in the presence of 1.4 cc. of $BF_3$ etherate in the same manner as outlined in part A of this example. The product was similar in its characteristics to that obtained in part A. It was a mixture of chlorohydrin ethers of sorbitol containing an average of 1.5 chlorohydrin groups per mole.

Quaternary ammonium compounds prepared from the above condensates were prepared in the below examples in the following manner.

The reactants were charged into a suitable flask fitted with a stirrer and a thermometer, and the reactants were then heated with vigorous agitation at the specified temperatures for the indicated periods of time. Initially the reactants were immiscible and as the reaction proceeded the mixture gradually became homogeneous except in the reaction with cetyl morpholine which reaction was only partially complete, even after a fairly long reaction period at temperatures above 130° C. As the reaction progressed the viscosity of the reaction mixtures increased markedly.

| Example | Gms. of Epichlorohydrin Condensate | Epichlorohydrin Condensate | Gms. of Tertiary Amine | Tertiary Amine | Reaction Time in hours | Reaction Temp., °C. | Nature of Product |
|---|---|---|---|---|---|---|---|
| 2 | 185 | Example I, Part A | 213 | Lauryl Dimethyl Amine | 5½ | 109–121 | Soft waxy solid water soluble. |
| 3 | 206 | Example I, Part B | 157 | ...do... | 2¾ | 112–130 | Do. |
| 4 | 160 | Example I, Part C | 157 | ...do... | 5½ | 102–130 | Do. |
| 5 | 160 | ...do... | 172 | Cetyl Morpholine | 10½ / 8 | 101–125 / 131–164 | 2 phase system, lower viscous layer amounted to 235 gms. |
| 6 | 166 | ...do... | 227 | Octadecyl Dimethyl Amine | 2 | 102–133 | Waxy solid water soluble. |
| 7 | 214 | ...do... | 350 | Dimethyl Aminoethyl Stearate | 4¾ | 107–126 | Do. |
| 8 | 214 | ...do... | 319 | 2 hydroxy 5 dodecyl Benzyl Dimethyl Amine | 24½ | 114–130 | Resinous solid. |

The foregoing examples exemplify the quaternization of a tertiary amine with a condensate of an epihalohydrin and a polyol having at least three hydroxyl groups.

The following examples exemplify the quaternization of a tertiary amine with the condensate of an epihalohydrin and a polyoxyalkylene ether of an aliphatic polyol having at least three hydroxyl groups.

Example 9

270 parts of 2 polyoxyethylene sorbitol and 1 part of $BF_3$ etherate were heated to 100° C. and 135 parts of epichlorohydrin were added with stirring during 30 minutes keeping the temperature at 100° to 110° C. The mixture was stirred for another hour at 100° to 110° C. to insure complete reaction. The product was a viscous syrup, which was reacted with 269 parts of cetyl dimethylamine with vigorous agitation and heating for 4½ hours at 90° to 135° C. to yield the corresponding quaternary ammonium compound.

Example 10

304 parts of 2 polyoxypropylene sorbitol and 1 part of $BF_3$ etherate were heated to 100° C. and 135 parts of epichlorohydrin were added with stirring during 30 minutes keeping the temperature at 100° to 110° C. to insure complete reaction. The product, a viscous syrup, was then reacted with 295 parts of octadecenyl dimethylamine for 3½ hours at a temperature ranging from 110° C. to 135° C. to yield the corresponding quaternary ammonium compound.

Example 11

446 parts of 6 polyoxyethylene sorbitol and 1 part of $BF_3$ etherate were heated to 100° C. and 135 parts of epichlorohydrin were added with stirring during 30 minutes keeping the temperature at 100° to 110° C. The mixture was stirred for another hour at 100° to 110° C. to insure complete reaction. The product, a viscous syrup, was then reacted with 297 parts of octadecyl dimethylamine with vigorous agitation and heating from 112° to 135° C. to yield the corresponding quaternary amine.

Example 12

518 parts of 6 polyoxypropylene sorbitol and 1 part of $BF_3$ etherate were heated to 100° C. and 185 parts of epichlorohydrin were added with stirring during 30 minutes, keeping the temperature at 100° to 110° C. to insure complete reaction. The product, a viscous syrup, was then reacted with 213 parts of lauryl dimethylamine with vigorous agitation and heating from 95° to 135° C. for 3½ hours to yield the corresponding quaternary amine.

It will be understood that the embodiments of the invention described in the specification and illustrated by the examples are only illustrative of the compounds and the manner in which they are produced. Various modifications can be made without departing from the principles of the invention.

What is claimed is:

1. A chemical compound of the formula:

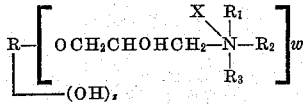

wherein:
R = the hydroxyl free residue of a hexitol
w = 1 to 6
z = 6—w
$R_1$ = an alkyl radical with 6 to 25 carbon atoms
$R_2$ and $R_3$ are lower alkyl radicals
X = a halide 2. A chemical compound of the formula:

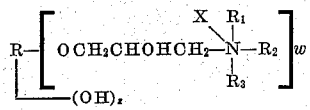

wherein:
R = the hydroxyl free residue of a hexitol
w = 1 to 6
z = 6—w
$R_1$ = a lipophilic radical of from 6 to 25 carbon atoms containing an alkyl group of from 6 to 18 carbon atoms
$R_2$ and $R_3$ are lower alkyl radicals
X = a halide 3. A compound of the formula of claim 2 wherein the radical

is

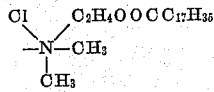

4. A chemical compound of the formula

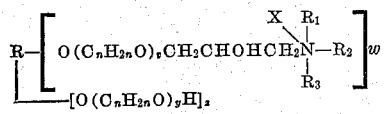

R is the hydroxyl free residue of a hexitol
n is 2 to 3
y is 0 to 10
v is 0 to 10
w is 1 to 6
z is 0 to 6
z+w = 6
vw+yz = not greater than 10
$R_1$ is a lipophilic radical of from 6 to 25 carbon atoms containing an alkyl group of from 16 to 18 carbon atoms
$R_2$ and $R_3$ are lower alkyl radicals
x is a halide 5. A compound as described in claim 4 wherein $R_1$ is an aliphatic radical with 6 to 25 carbon atoms.

6. The compounds of claim 4 wherein

is dimethyl lauryl amine.

7. The compounds of claim 4 wherein

is dimethyl cetyl amine.

8. The compounds of claim 4 wherein

is dimethyl octadecyl amine.

9. The compounds of claim 4 wherein

is dimethyl amino ethyl stearate.

10. The compounds of claim 4 wherein

is dimethyl amino ethyl oleate.

11. The process of preparing quaternary ammonium halides which comprises reacting an epihalohydrin with a polyhydroxylic compound of the formula:

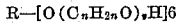

wherein:
R is the hydroxyl free residue of a hexitol
n = 2 to 3
v = 0 to 10 in the presence of an acidic type catalyst to produce a glycerol halohydrin ether of said polyhydroxylic compound, and then reacting said ether with a tertiary amine of the formula:

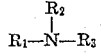

wherein:
$R_1$ is a lipophilic radical of from 6 to 25 carbon atoms containing an alkyl group of from 6 to 18 carbon atoms
$R_2$ and $R_3$ are alkyl radicals to form a quaternary ammonium halide.

12. The process of preparing quaternary ammonium halides which comprises reacting an epihalohydrin with polyhydroxylic compound of the formula:

wherein:
R is the hydroxyl free residue of a hexitol
n = 2 to 3
v = 0 to 10 in the presence of an acidic type catalyst, to yield a glycerol halohydrin ether of said polyhydroxylic compound, and thereafter reacting said ether with a tertiary amine of the formula:

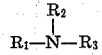

wherein:

$R_1$ is a lipophilic radical of from 6 to 25 carbon atoms containing an alkyl group of from 6 to 18 carbon atoms $R_2$ and $R_3$ are lower alkyl radicals at a temperature of 90° to 135° C. to yield a quaternary ammonium halide.

13. The process of preparing quaternary ammonium halides which comprises reacting an epihalohydrin with a hexitol in the presence of $BF_3$ as a catalyst, to produce a glycerol halohydrin ether of the hexitol and then reacting said ether with a tertiary amine having one long chain aliphatic alkyl group of 6 to 25 carbon atoms and two short chain alkyl groups of 1 to 4 carbon atoms at a temperature of 90° to 135° C. to yield a quaternary ammonium halide.

14. The process of preparing a quaternary ammonium halide which comprises reacting sorbitol with from 1 to 2 molecular proportions of epichlorohydrin to produce a glycerol chlorohydrin ether of sorbitol, and thereafter reacting said ether with a tertiary amine having one long chain aliphatic radical of 6 to 25 carbon atoms and two short chain aliphatic radicals of 1 to 4 carbon atoms to produce the quaternary ammonium chloride.

References Cited in the file of this patent

UNITED STATES PATENTS

| | | |
|---|---|---|
| 2,060,850 | Calcott et al. | Nov. 17, 1936 |
| 2,087,506 | De Groote | July 20, 1937 |
| 2,255,252 | Harris | Sept. 9, 1941 |
| 2,483,749 | Wittcoff | Oct. 4, 1949 |
| 2,547,965 | Olin | Apr. 10, 1951 |
| 2,653,156 | Deutsch et al. | Sept. 22, 1953 |

FOREIGN PATENTS

| | | |
|---|---|---|
| 538,718 | Great Britain | Aug. 14, 1941 |